United States Patent
McCutcheon

(10) Patent No.: US 12,424,041 B1
(45) Date of Patent: Sep. 23, 2025

(54) VEHICLE RENTING SYSTEM AND METHOD OF USE

(71) Applicant: Johnathan Franklin McCutcheon, Houston, TX (US)

(72) Inventor: Johnathan Franklin McCutcheon, Houston, TX (US)

( * ) Notice: Subject to any disclaimer, the term of this patent is extended or adjusted under 35 U.S.C. 154(b) by 0 days.

(21) Appl. No.: 17/244,271

(22) Filed: Apr. 29, 2021

(51) Int. Cl.
*G07C 9/22* (2020.01)
*G06Q 30/0645* (2023.01)
*G07C 9/00* (2020.01)
*G07C 9/27* (2020.01)

(52) U.S. Cl.
CPC ........... *G07C 9/22* (2020.01); *G06Q 30/0645* (2013.01); *G07C 9/00309* (2013.01); *G07C 9/00896* (2013.01); *G07C 9/27* (2020.01); *G07C 2009/00769* (2013.01); *G07C 2009/00936* (2013.01)

(58) Field of Classification Search
CPC ............ G07C 9/00309; G07C 9/00896; G07C 2009/00769; G07C 2009/00936
See application file for complete search history.

(56) References Cited

U.S. PATENT DOCUMENTS

| 11,488,241 B2 * | 11/2022 | Shoen ................. G06Q 20/4014 |
| 2018/0118131 A1 * | 5/2018 | Lowell ................. B60R 11/0241 |
| 2019/0139337 A1 * | 5/2019 | Briskey ............... G07C 9/00912 |
| 2021/0053530 A1 * | 2/2021 | Bohl ..................... G06V 40/172 |

* cited by examiner

*Primary Examiner* — Omer S Khan
(74) *Attorney, Agent, or Firm* — McCutcheon Joseph, PLLC

(57) ABSTRACT

A vehicle rental system includes a vehicle lockbox having a body forming an interior cavity; a door locked to the body via an electronic lock, the electronic lock to unlock via communication with a mobile device; and a clip to secure the vehicle lockbox to a window; the mobile device allows for a user to establish rental terms and verify an identity of the user; and a kill switch in communication with a computer of a vehicle and configured to wirelessly communicate with the mobile device; verification of the identity of the user deactivates the kill switch to allow activation of the vehicle.

11 Claims, 7 Drawing Sheets

VEHICLE RENTING SYSTEM AND METHOD OF USE

BACKGROUND

1. Field of the Invention

The present invention relates generally to vehicle rental systems, and more specifically, to a vehicle rental system with automated key retrieval and driver recognition for security.

2. Description of Related Art

Vehicle rental systems are well known in the art and are effective means to for individuals to rent vehicles. For example, FIG. 1 depicts a flowchart 101 of a conventional rental system involving an individual going to a physical location, signing a rental agreement, making payment, and then receiving the keys to a vehicle, as shown with boxes 103, 105, 107.

One of the problems commonly associated with conventional vehicle rental systems is the need for personnel to manage the transaction.

Accordingly, although great strides have been made in the area of vehicle rental systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
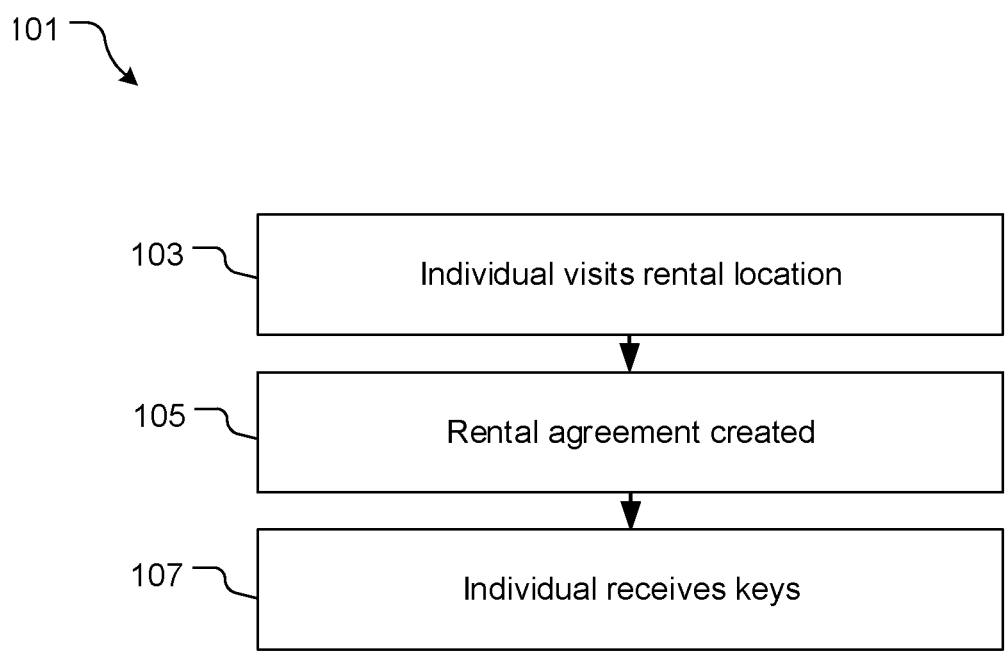
FIG. 1 is a flowchart of a conventional vehicle rental system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional vehicle rental systems. Specifically, the present invention provides a means to allow for an individual to set the terms of a rental arrangement, along with the ability to retrieve keys and provide a means for renter verification, without additional rental personnel. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2A:
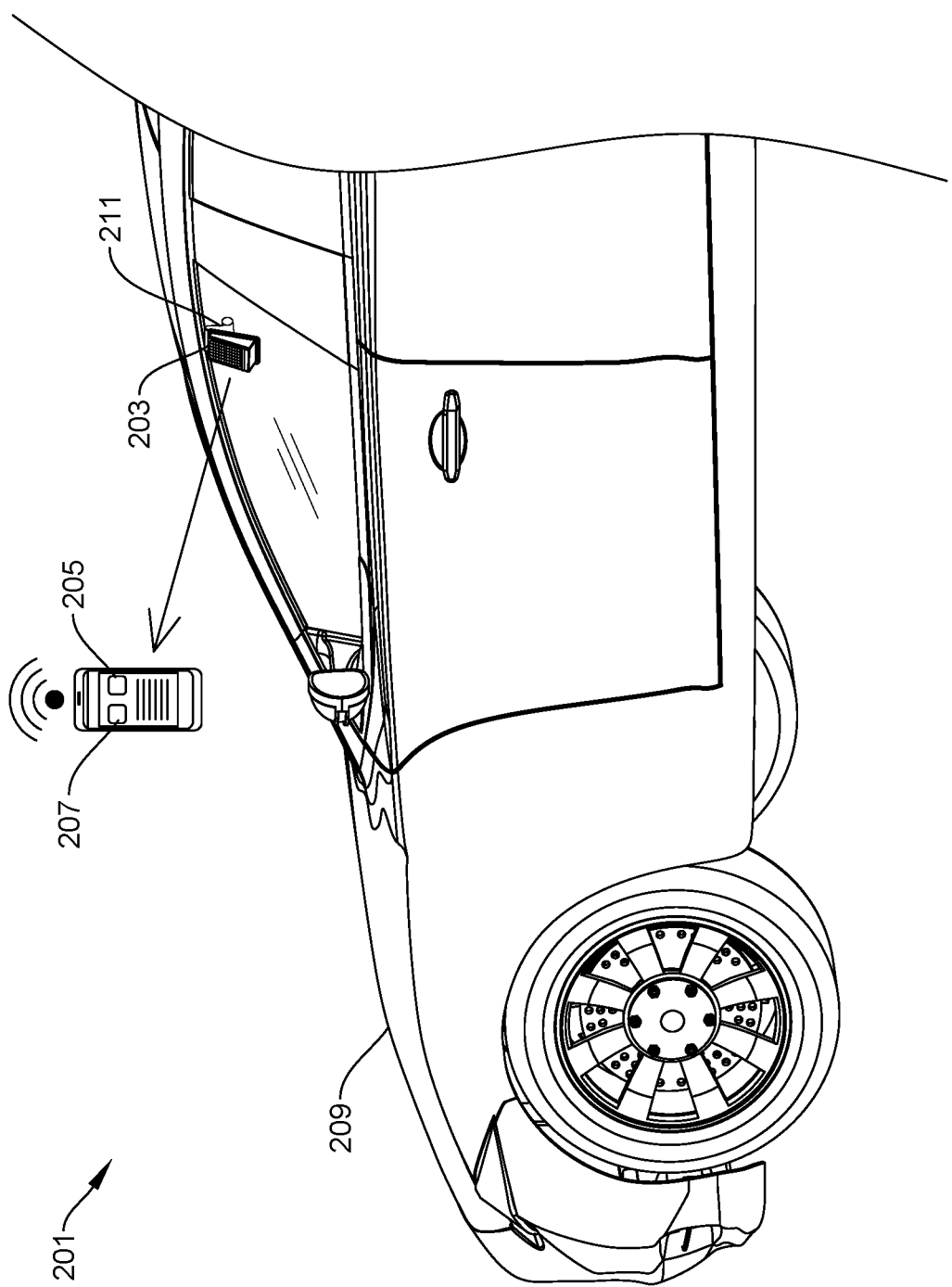
FIGS. 2A and 2B are schematic views of an exterior and interior of a vehicle incorporating the vehicle rental system in accordance with a preferred embodiment of the present application.
Figure 2B:
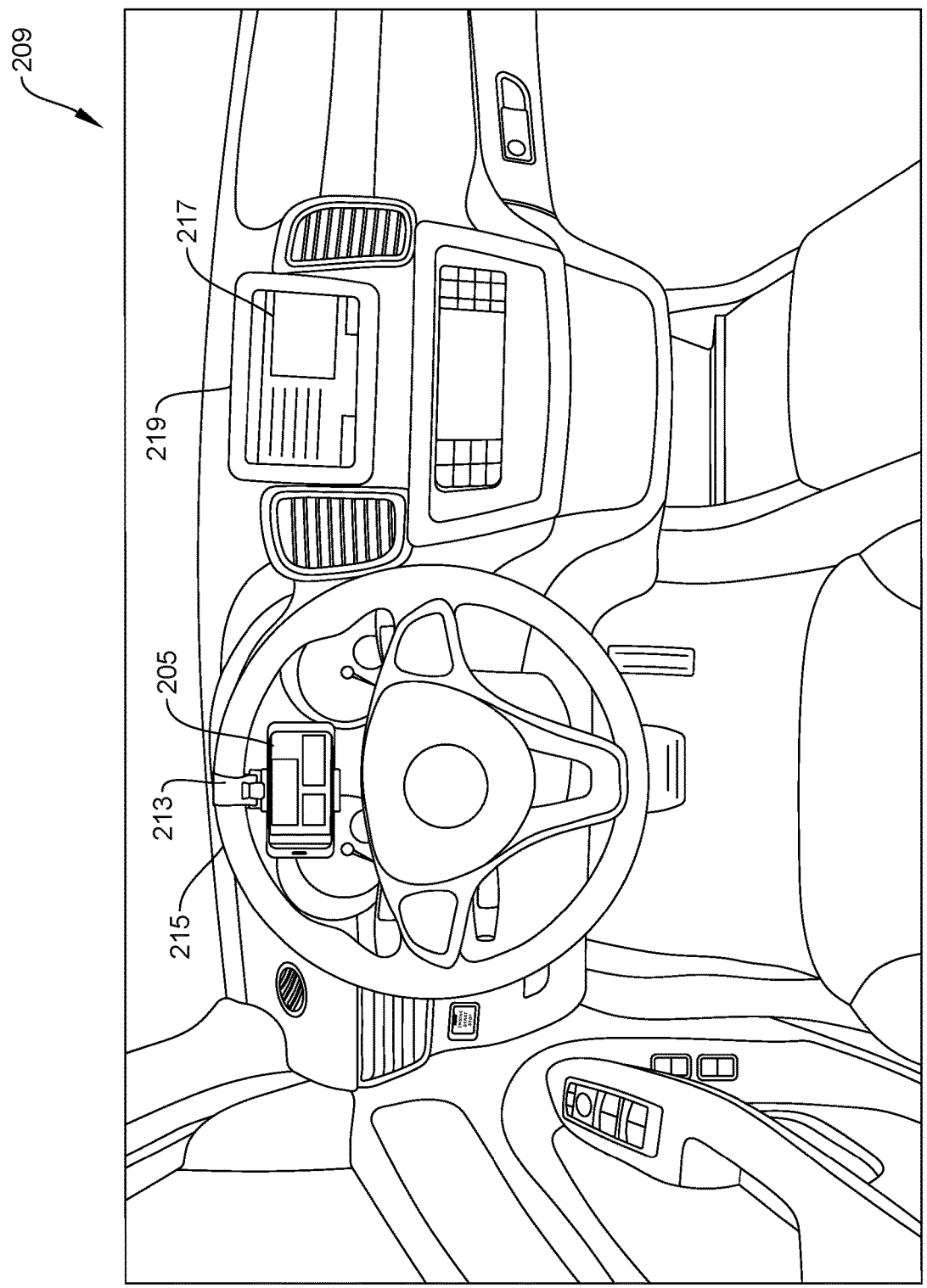

Referring now to the drawings wherein like reference characters identify corresponding or similar elements throughout the several views, FIGS. 2A-2B depict an exterior side view and an interior view of a vehicle, incorporating the vehicle rental system 201 in accordance with a preferred embodiment of the present application. It will be appreciated that system 201 overcomes one or more of the above-listed problems commonly associated with conventional vehicle rental systems.

In the contemplated embodiment, system 201 includes a lockbox 203 configured to wirelessly communicate with a mobile device 205, via any known technology, such as Bluetooth. Mobile device 205 includes a mobile platform 207 configured to provide a means for the user to establish a rental agreement with a rental company. It should be appreciated, and will be described in more detail, that the platform 207 can allow for the user to make payments, sign an agreement, an input identifying information. Further, the platform 207 along with mobile device 205 provides a means for the user to unlock box 203 to provide access to a vehicle key. As further shown, lockbox 203 is secured to a window of vehicle 209 via a clip 211, however, it should be appreciated that alternative means could be used.

As further shown with FIG. 2B, within an interior of vehicle 209 is a mounting apparatus 213, configured to hold mobile device 205 on steering wheel 215. This feature allows for a camera of device 205 to face both the vehicle dash and the user. During use, the mobile device can then be used to record information such as gas level, mileage, and the like associated with vehicle 209. Further, the mobile device, along with platform 207 can be used to complete facial recognition of the driver, thereby making the rental secure.

In the preferred embodiment, a kill switch 217 is incorporated into a computer 219 of the vehicle. It must be understood that switch 217 is shown primarily for clarity and can vary in form and location, being located within the body of the car and not visible.

Kill switch 217 is configured to wirelessly communicate with mobile device 205. The kill switch is programmed to prevent activation of vehicle 209 until the identity of the driver is determined. Upon determination of identity, such as through facial recognition, the kill switch is deactivated, allowing for the vehicle to become activate.

Figure 3A:
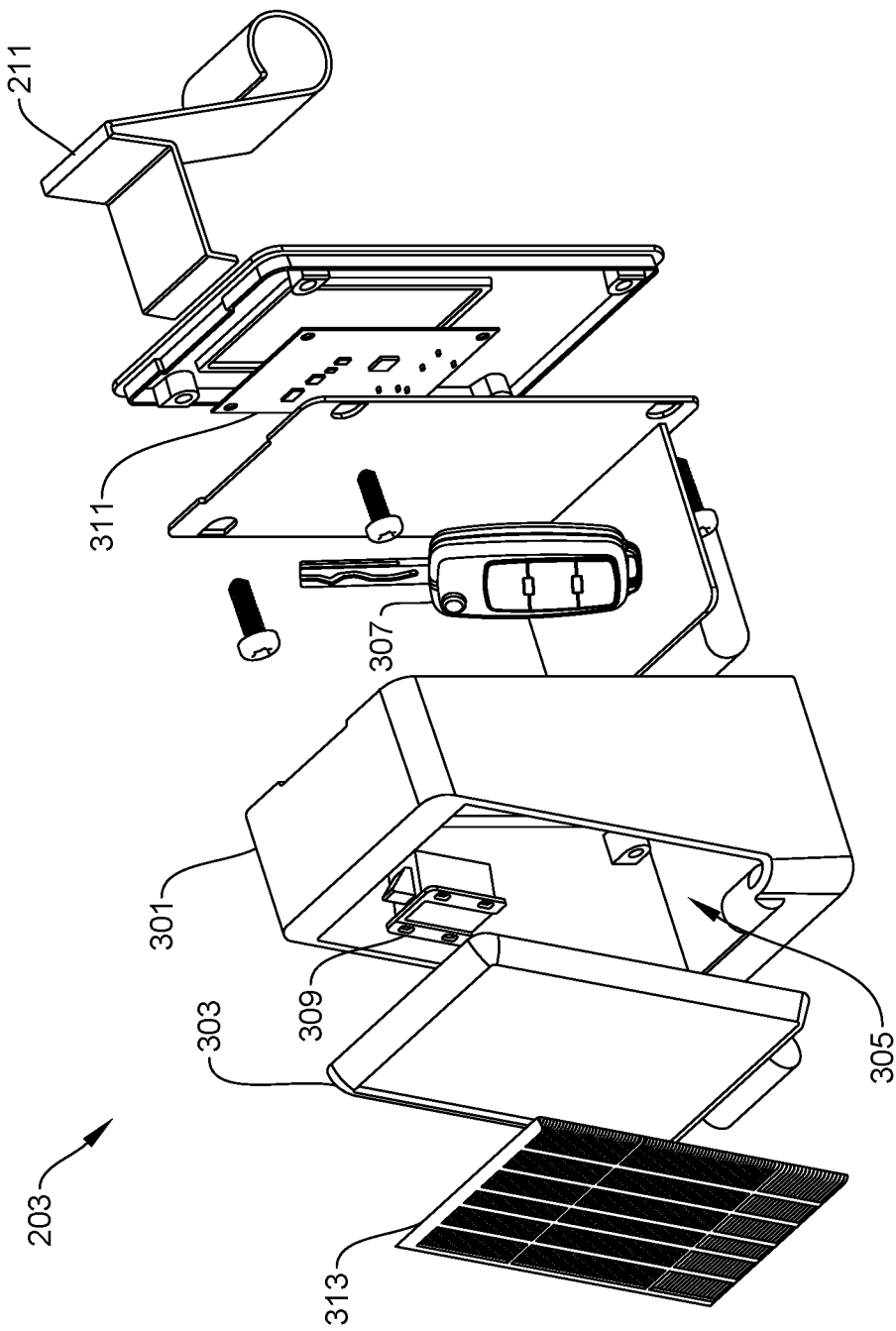
FIGS. 3A and 3B are exploded and cross-sectional views of a key lockbox of FIGS. 2A and 2B.
Figure 3B:
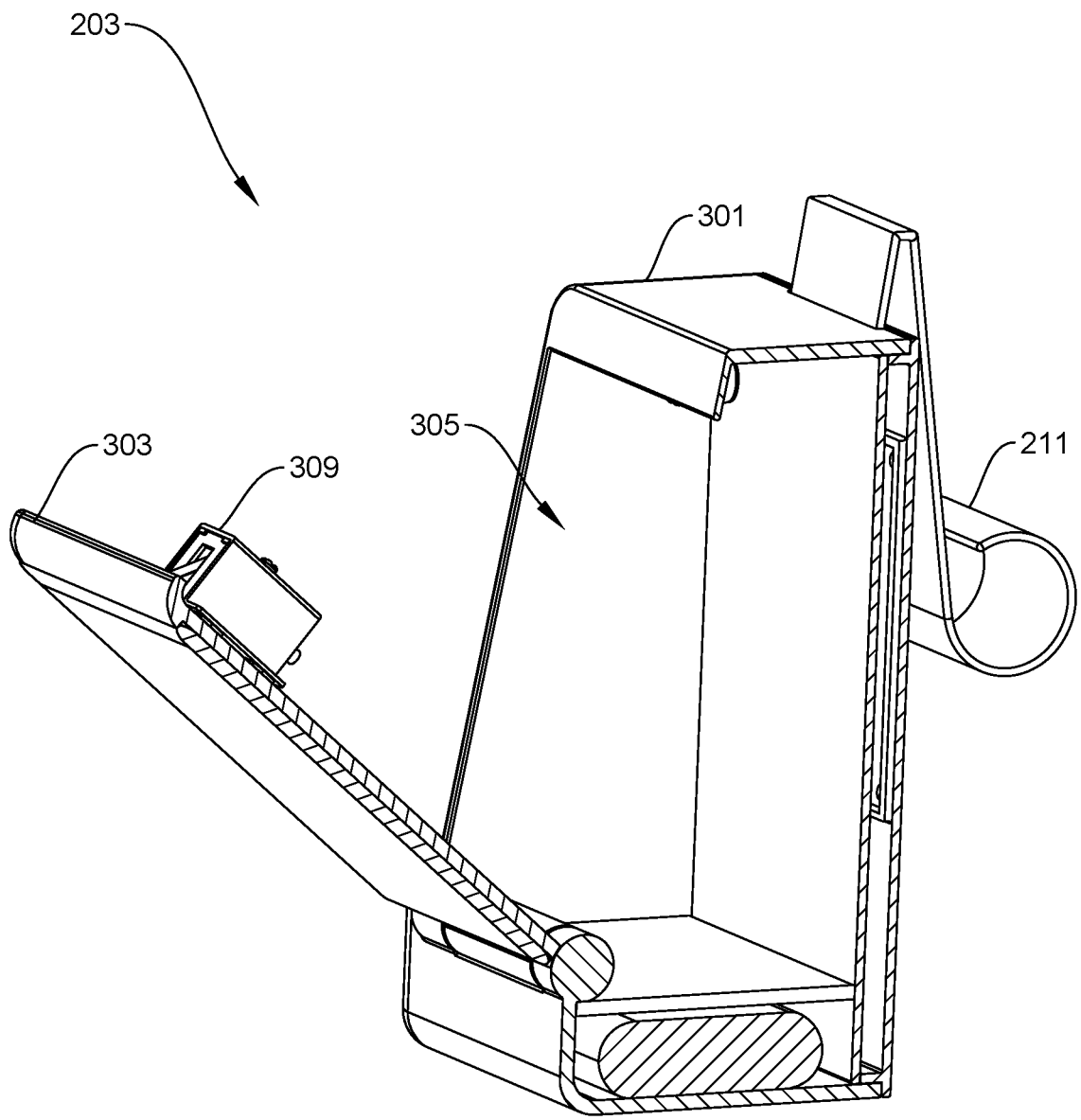

In FIGS. 3A and 3B, exploded and cross sectional views of lockbox 203 are shown. In this embodiment, lockbox 203 includes a body 301 with a door 303 pivotally secured thereto and creating an interior area 305, wherein a key 307 is retained. An electronic lock 309 locks door 303 to body 301, and is configured to be unlocked via a command from a control system 311. In the preferred embodiment, control system 311 wirelessly communicates with the mobile device to receive the command to unlock box 203. In some embodiments, a solar panel 313 is configured to provide power to the electronic components of lockbox 203.

Figure 4:
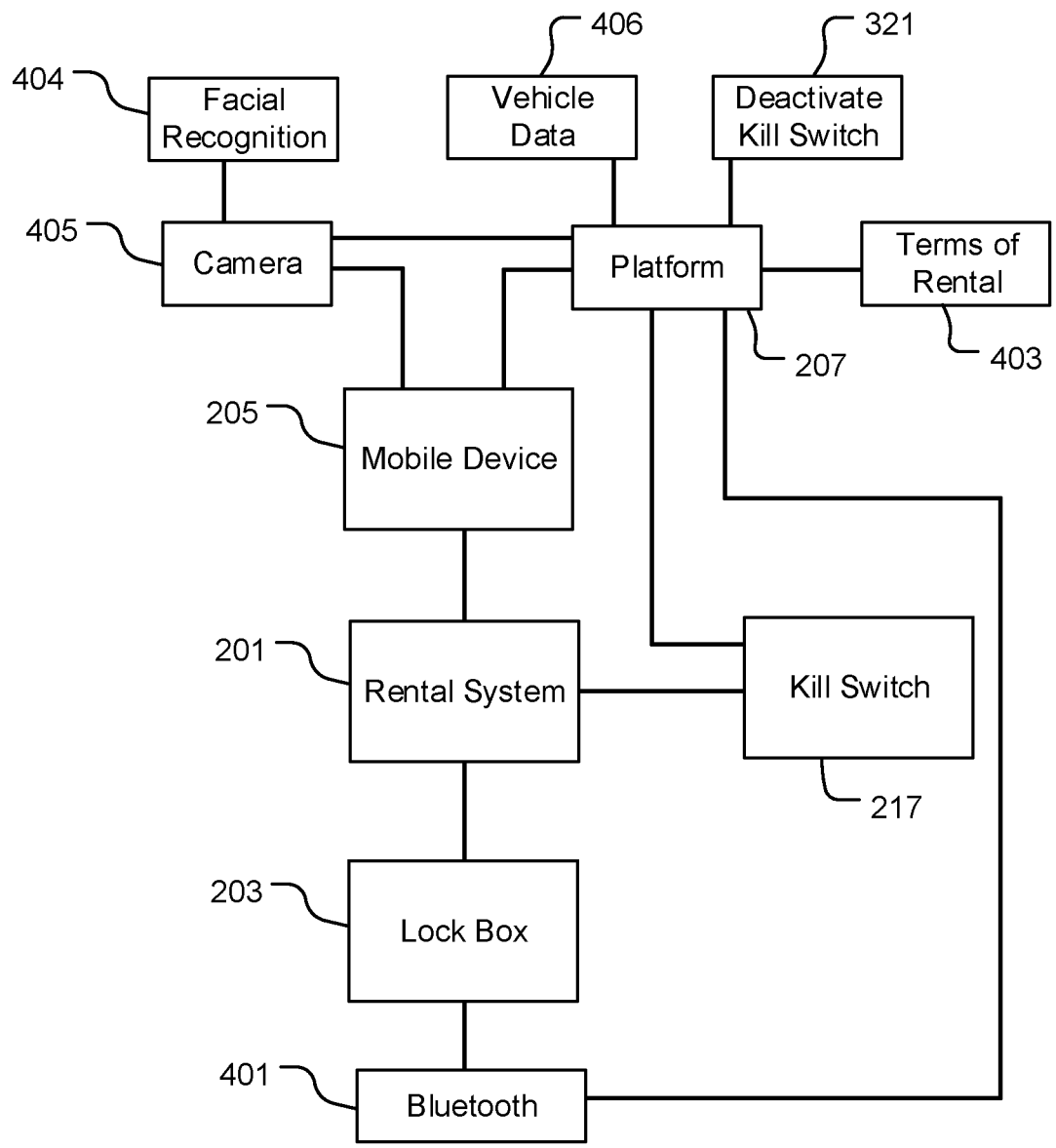
FIG. 4 is a schematic of the features of the system of FIGS. 2A and 2B.

In FIG. 4, a simplified schematic depicts the features contemplated for system 201. A lockbox 203 includes Bluetooth or similar technology 401 configured to wirelessly communicate with mobile device 205 via platform 207. From the platform, the user can arrange for a vehicle rental 403, wherein details such as pick up location, time, day, length, vehicle type, and any other details could be established. The user would further input identifying details, such as driver's license number, address, payment, etc. After the rental terms are established, the correlating lockbox, having a unique identifier, to the vehicle picked, will be programmed to unlock based upon a command from the mobile platform.

Further, mobile device 205 includes a camera 405 configured to determine identity of the user via facial recognition 404, wherein the verification of the user's identity is transmitted from the platform to a kill switch 217 is deactivated, thereby allowing for vehicle use. Further, the camera 405 can monitor information 406 associated with the vehicle, such as gas consumption and miles driven.

It should be appreciated that one of the unique features believed characteristic of the present application is the incorporation of the three main elements, namely a mobile device, an electronic lockbox, and a kill switch, allow for easy rental of a vehicle with limited rental personnel.

Figure 5:
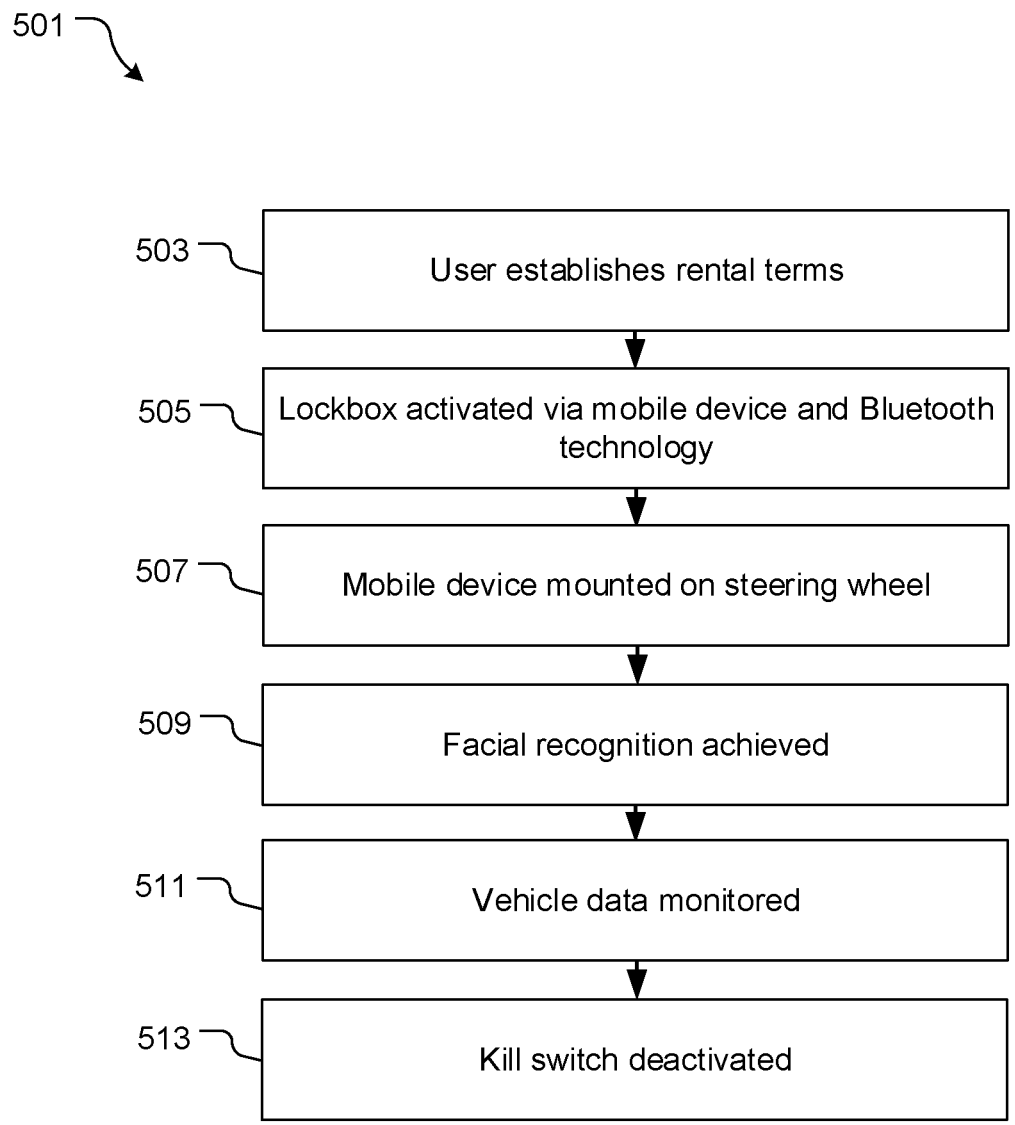
FIG. 5 is a flowchart of the method of use of the system of FIGS. 2A and 2B.

In FIG. 5, a flowchart further depicts the method of use of system 201. During use, the user establishes rental terms, as shown with box 503. As the user approaches the rented vehicle, the user can unlock the lockbox via a mobile device and platform, as shown with box 505. The user can then proceed to mount the mobile device on the steering wheel, wherein a forward facing camera can provide for facial recognition, and a rear facing camera can monitor details of the vehicle, as shown with boxes 507, 509, 511. Based on identity verification, the kill switch is deactivated to allow driving by the user, as shown with box 513.

It is contemplated that the rental platform can include additional features, such as collecting insurance information from the driver, facilitating payment from the driver to the rental company, collecting ratings from the driver and rental company, etc.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A vehicle rental system, comprising:
    a vehicle lockbox, having:
        a body forming an interior cavity configured to store a vehicle key therein;
        a door pivotally secured to the body;
        an electronic lock configured to lock the door closed to the body and the electronic lock is in communication with a control system configured to wirelessly communicate with a mobile device that is configured to lock and unlock the door for access to the interior cavity; and
        a clip configured to secure the vehicle lockbox to a window of a vehicle, wherein the mobile device has a platform configured to permit a user to establish rental terms and to verify an identity of the user via a camera with facial recognition, wherein the camera is configured to capture an image of the user face and send the image of the user face to the platform for identification, wherein the camera is further configured to capture an image of a vehicle dashboard and send the image of the vehicle dashboard to the platform for monitoring and recording vehicle data displayed on the vehicle dashboard, wherein the rental terms are displayed on a display of the mobile device, and wherein when the facial recognition of the user is identified via the platform, then the electronic box is unlocked for the user to retrieve a key;
    a kill switch in communication with a computer of the vehicle and configured to wirelessly communicate with the mobile device, wherein the kill switch is configured to stop movement of the vehicle; and
    after the required facial recognition and rental terms have been received and identity of the user has been verified, transmit a command to the kill switch of the vehicle to deactivate the kill switch to thereby permit the user to start the vehicle with the key.

2. The system of claim 1, further comprising:
    a mounting apparatus secured to a steering wheel of the vehicle and configured to receive the mobile device.

3. A method of renting a vehicle, the method comprising:
    locking a door of a vehicle lockbox closed for access to interior cavity of a body of the lockbox of storing a vehicle key;
    traveling to a location of the vehicle;
    wirelessly communicate with a mobile device that is configured to lock and unlock the door of the lockbox;
    securing the lockbox to a window of the vehicle by a clip, wherein the mobile device has a platform configured to permit a user to establish rental terms and to verify an identity of the user via a camera with facial recognition, wherein the camera is configured to capture an image of the user face and send the image of the user face to the platform for identification, wherein the camera is further configured to capture an image of a vehicle dashboard and send the image of the vehicle dashboard to the platform for monitoring and recording vehicle data displayed on the vehicle dashboard, wherein the rental terms are displayed on a display of the mobile device, and unlocking the vehicle lockbox via the mobile device;

wherein when the facial recognition of the user is identified via the platform, then the electronic box is unlocked for the user to retrieve a key; and a kill switch in communication with a computer of the vehicle and configured to wirelessly communicate with the mobile device, wherein the kill switch is configured to stop movement of the vehicle; and after the required facial recognition and rental terms have been received and identity of the user has been verified, transmit a command to the kill switch of the vehicle to deactivate the kill switch to thereby permit the user to start the vehicle with the key.

4. The method of claim 3, further comprising: mounting the mobile device on a steering wheel of the vehicle via a mounting apparatus.

5. The system of claim 1, wherein the vehicle data comprises gas level.

6. The system of claim 1, wherein the vehicle data comprises milage.

7. The system of claim 1, wherein the vehicle data comprises vehicle speed.

8. A platform for a mobile device for facilitating rental of a vehicle by a human driver, wherein the platform is operable to:

receive and display personal information and rental terms of a vehicle rental agreement entered by the human driver via the mobile device;

receive an image of the human driver captured by a camera of the mobile device; and verify identity of the human driver by performing facial recognition on the image of the human driver;

after the required personal information and rental terms have been received and identity of the human driver has been verified, transmit a command to a vehicle key lockbox to unlock the vehicle key lockbox such that the human driver can access an ignition key to the vehicle and transmit a command to a kill switch of the vehicle to deactivate the kill switch to thereby permit the human driver to start the vehicle with the ignition key; and while the vehicle is being driven:

receive an image of a vehicle dashboard captured by the camera of the mobile device; and monitor and record vehicle data displayed on the vehicle dashboard based on the image of the vehicle dashboard.

9. The platform of claim 8, wherein the vehicle data comprises gas level.

10. The platform of claim 8, wherein the vehicle data comprises milage.

11. The platform of claim 8, wherein the vehicle data comprises vehicle speed.

* * * * *